United States Patent
Lebosq et al.

(10) Patent No.: US 11,274,656 B2
(45) Date of Patent: Mar. 15, 2022

(54) METHOD OF DETERMINING A POWER CURVE OF A WIND TURBINE

(71) Applicant: Wobben Properties GmbH, Aurich (DE)

(72) Inventors: Rodolphe Lebosq, Aurich (DE); Dennis Peter, Emden (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/833,091

(22) Filed: Mar. 27, 2020

(65) Prior Publication Data
US 2020/0309093 A1 Oct. 1, 2020

(30) Foreign Application Priority Data
Mar. 29, 2019 (DE) .......................... 102019108244.7

(51) Int. Cl.
*F03D 7/04* (2006.01)
*F03D 7/02* (2006.01)
*G01P 5/26* (2006.01)

(52) U.S. Cl.
CPC ............ *F03D 7/046* (2013.01); *F03D 7/045* (2013.01); *F03D 7/048* (2013.01); *F03D 7/028* (2013.01);
(Continued)

(58) Field of Classification Search
CPC .......... F03D 7/046; F03D 7/045; F03D 7/048; F03D 7/028; G01P 5/26; G05B 2219/2619
See application file for complete search history.

(56) References Cited
U.S. PATENT DOCUMENTS 7,805,222 B2 9/2010 Jurkat
2011/0148112 A1* 6/2011 Ormel .................... F03D 17/00
290/44
(Continued)

FOREIGN PATENT DOCUMENTS

DE 102016011005 A1 3/2018
EP 2020506 A2 2/2009
(Continued)

OTHER PUBLICATIONS

Li et al., "Analyses of the Extensible Blade in Improving Wind energy Production at Sites with Low-Class wind Resource", Aug. 30, 2017, pp. 24, downloaded from the internet file:///C:/Users/olopez/Downloads/energies-10-01295%20(2).pdf (Year: 2017).*
(Continued)

*Primary Examiner* — Jason Lin
*Assistant Examiner* — Olvin Lopez Alvarez
(74) *Attorney, Agent, or Firm* — Seed IP Law Group LLP

(57) ABSTRACT

Provided is a method of determining a power curve, which specifies a correlation between wind speed and a power output of a first turbine. Wind speed is calculated based on a measurement correlation, specifies a correlation between the rotor behavior and the wind speed, derived from rotor behavior. The measurement correlation is trained using a second turbine of identical construction having a sensor. While the second turbine is operated at varying wind speeds, the sensor repeatedly records and assigns a wind speed to a simultaneously recorded rotor behavior of the second turbine to produce the measurement correlation. The power curve is produced by repeatedly and simultaneously recording a power output of the first turbine and an associated wind speed while operating the first turbine at varying wind speeds. The wind speed is calculated from rotor behavior of
(Continued)

the first turbine based on the measurement correlation trained using the second turbine.

17 Claims, 2 Drawing Sheets

(52) U.S. Cl.
CPC ........ *G01P 5/26* (2013.01); *G05B 2219/2619* (2013.01)

(56) References Cited

U.S. PATENT DOCUMENTS

| | | | | |
|---|---|---|---|---|
| 2013/0209220 A1* | 8/2013 | Nielsen | ................ | F03D 7/0296 415/1 |
| 2013/0243590 A1* | 9/2013 | Edenfeld | ................ | F03D 17/00 416/1 |
| 2013/0302161 A1* | 11/2013 | Koerber | ................ | F03D 1/0675 416/1 |
| 2013/0315746 A1* | 11/2013 | Huang | ................ | F03D 1/0633 416/223 R |
| 2014/0054476 A1* | 2/2014 | Zheng | ................ | F03D 17/00 250/578.1 |
| 2014/0154075 A1* | 6/2014 | Kristoffersen | ........ | F03D 7/0224 416/1 |
| 2016/0298607 A1* | 10/2016 | Gregg | ................ | F03D 9/257 |
| 2017/0122289 A1* | 5/2017 | Kristoffersen | .......... | F03D 7/024 |
| 2018/0030955 A1* | 2/2018 | Vaddi | ........................ | F03D 9/25 |
| 2019/0063406 A1* | 2/2019 | Nielsen | .................... | F03D 7/048 |
| 2019/0120208 A1* | 4/2019 | Geisler | .................... | F03D 7/045 |
| 2019/0226451 A1* | 7/2019 | Deshpande | ............. | F03D 7/028 |
| 2019/0345915 A1* | 11/2019 | Picard | ....................... | F03D 9/25 |
| 2019/0368465 A1* | 12/2019 | Mandrioli | ............... | F03D 7/028 |
| 2020/0056589 A1* | 2/2020 | Evans | ..................... | F03D 7/028 |

FOREIGN PATENT DOCUMENTS

| | | |
|---|---|---|
| EP | 3421784 A1 | 1/2019 |
| WO | 2011157271 A2 | 12/2011 |

OTHER PUBLICATIONS

Ying et al, "Blade tip Deflections Calculations and Safety Analysis of Wind Turbine", Sep. 2013, pp. 5 https://ieeexplore.ieee.org/document/6718752 (Year: 2013).*

Giyanani et al "Correlation between Lidar measured wind speeds and aerodynamic loading", 2018, pp. 1-10, downloaded from the internet https://iopscience.iop.org/article/10.1088/1742-6596/1037/5/052038/pdf (Year: 2018).*

*Wind Power Generation Systems, Part 12-1 "Power Performance Measurement of Electricity Producing wind Turbines,"* (IEC 61400-12-1:2017), German Version EN 61400-12-1:2017 (with Corresponding English Publication), Mar. 2017, 32 pages.

* cited by examiner

METHOD OF DETERMINING A POWER CURVE OF A WIND TURBINE

BACKGROUND

Technical Field

The present invention relates to a method of determining a power curve of a wind turbine. The present invention also relates to such a wind turbine and the present invention also relates to an arrangement comprising a plurality of wind turbines, of which at least one wind turbine produces a power curve.

Description of the Related Art

Wind turbines are known and they convert the wind energy into electrical power. The power output depends very substantially on the wind speed. A correlation between wind speed and the converted power output is shown by a power curve. Such a power curve can usually be shown graphically in such a way that the wind speed is plotted on the x-axis and the output that can be generated is plotted on the y-axis of a Cartesian coordinate system.

A power curve of this kind indicates the efficiency of the turbine and can be used not only to control the turbine, but also to rate the turbine or to evaluate the operation of the turbine. The wind turbine must therefore be operated in order to record a power curve, and the power generated must be recorded together with the respective and associated wind speed. How to measure such a power curve is specified in International Standard IEC 61400-12-1, for example.

One particular problem concerns how to measure the wind speed as precisely as possible. A nacelle anemometer, in particular, is not sufficient in many cases to record such a power curve, or at the least is very imprecise. There are ranges, at least, which are difficult to measure using such a nacelle anemometer, in particular high wind speeds when there are additional gusts of wind. Other measuring sensors, such as lidar sensors, can also be problematic. The measuring capability of a lidar may depend on the purity of the air, and this also includes the presence of rain, which from the metrological perspective has an effect like air pollution.

For this reason, it is frequently proposed, as is also proposed in the aforementioned international standard, that an appropriately high-precision measuring mast be erected at a predetermined distance from the wind turbine in order to record the power curve. It should be noted that a power curve is recorded when operation of the wind turbine starts, in particular, so it makes sense to use such a measuring mast that can be dismantled again if necessary after measuring the power curve.

The problem with such a measurement obtained using a measurement mast is that the latter measures the wind speed relevant for the respective wind turbine only when the wind is blowing in exactly the same direction as from the measurement mast to the wind turbine, in other words when the measurement mast is positioned exactly windward of the wind turbine. If the wind changes direction, the measurement is skewed. This may result in a measurement taking a long time, i.e., measurement must be carried out until a sufficient number of different wind speeds have occurred for precisely that wind direction.

BRIEF SUMMARY

Improving how a power curve for a wind turbine is recorded in comparison with methods known hitherto is provided herein. At the least, an alternative solution to previously known solutions is to be proposed.

A method is provided. The method is thus provided for determining a power curve of a first wind turbine. This can also be referred to as measuring the power curve. Such a wind turbine has a rotor, by which is meant an aerodynamic rotor. Such a rotor, for its part, has one or more rotor blades, namely three rotor blades, in particular.

The method thus relates to a power curve that specifies a correlation between wind speed and the power output generated by the wind turbine. The method relates to determining or measuring the power curve of a first wind turbine. The method also uses another, second wind turbine, the importance of which is described below.

It is now proposed that, in order to sense the wind speed which is then needed to calculate the power curve, the wind speed be determined on the basis of a measurement correlation derived from a behavior of the rotor of this first wind turbine. The rotor is driven by the wind and thus rotates. However, the rotor also responds in other ways to the wind acting upon it. More specifically, the rotor blades bend or deform elastically depending on the wind speed. When such elastic deformation occurs, the blade can deform in several directions, and especially in every spatial direction. More especially, part of the blade can move in all directions relative to the blade root, thus resulting in the deformation. Thus, bending also includes an elastic deformation in several directions, not just a bend in one direction, although that can also occur.

Such elastic bending or elastic deformation of the rotor blades, which can be static and/or dynamic, is a behavior of the rotor, and conclusions about the wind speed can be drawn from such behavior. There is a correlation, namely, between the rotor behavior and the wind speed, and this correlation is referred to as a measurement correlation. What is proposed, therefore, is that the wind speed be determined on the basis of this measurement correlation derived from the behavior of the rotor.

Such a correlation between the rotor behavior and the wind speed is complex and nonlinear, however. The measurement correlation cannot readily be predetermined, therefore, or be specified in any other way or in simulations. Although precalculation or determination in simulations is possible, in principle, expectations with regard to accuracy must not be exaggerated. This also has to do with the fact that wind turbine rotor blades have not had to conform ideally to the designed model until now, and that the behavior of a large and complex rotor blade, which nowadays is more than 50 meters long in many cases, or of the respective rotor, cannot be predetermined in every respect. Other effects can also occur that are difficult to detect, such as tower shadow effects. It is now proposed here that the measurement correlation be trained using a second wind turbine of identical construction. The complex measurement correlation can thus be determined by such training. However, in order to determine this measurement correlation by training, it is proposed that a second wind turbine of identical construction be used. This is based on the discovery that a wind turbine whose power curve is to be measured does not have the measuring equipment needed to train the measurement correlation. The installation site may also be differently suitable for training. It has also been found, however, that the measurement correlation can be transferred between wind turbines of identical construction. More particularly, it has been found that different topologies of the respective wind turbine installation site have a negligible influence on the measurement correlation.

The second wind turbine, which has a reference wind sensor, is thus used for training purposes. This means that such a reference wind sensor is not needed by the first wind turbine, but only by the second wind turbine, so a relatively expensive reference wind sensor can also be used here.

With regard to training, it is then proposed that while the second wind turbine is being operated at varying wind speeds, the reference wind sensor repeatedly records a wind speed and assigns it to a simultaneously recorded behavior of the rotor of the second wind turbine, in order to produce the measurement correlation. Each of these assignments between the wind speed recorded by the reference wind sensor and the recorded behavior of the rotor thus forms part of the measurement correlation. By repeatedly recording the wind speed and the behavior of the rotor at varying wind speeds, it is thus possible to collect respective values, which then results in the measurement correlation in its entirety.

On that basis, the power curve of the first wind turbine is then produced by repeatedly and simultaneously recording a power output generated by the first wind turbine and an associated wind speed while operating the first wind turbine at varying wind speeds. A pair of values, namely the power generated and the associated wind speed measured, is basically produced each time. The pairs of values successively obtained can then form the power curve.

The wind speed is calculated from a behavior of the rotor of the first wind turbine on the basis of the measurement correlation trained by means of the second wind turbine.

It should be noted, as a basic principle, that the wind turbines, that is, both the first wind turbine when determining the power curve and also the second wind turbine when training the measurement correlation, are each operated with one, namely the same, power-speed curve. This power-speed curve involves recording a rotor speed and setting a power output according to that speed, namely in accordance with the power-speed curve. If this set power output is then equal to the power that the wind turbine generates from the wind, a stable operating point has been found.

If there are deviations, however, this results in the rotor speed increasing or decreasing, which in turn results in a new power value being set until a stable point is found, which does not usually take long. The wind turbine also responds accordingly to changes in wind speed, which result in the rotor speed increasing or the rotor speed decreasing, which in turn leads to an adjustment of the power output. This power-speed curve is thus used for both wind turbines and determines the operating point. The behavior of the rotor, also and in particular the bending of the rotor blade or blades, may also depend on the operating point. One reason for this is that the wind force acting on the rotor and thus on the rotor blades is also dependent on the rotor speed.

This correlation is also preferably assigned to the measurement correlation. It is proposed, at least, that this power-speed curve is taken as a basis when producing the power curve, i.e., the power-wind speed curve, and also when training the measurement correlation.

A torque-speed curve can also be used instead of a power-speed curve.

According to one embodiment, it is proposed that the first wind turbine be installed on a different installation site, in particular on a different wind farm, from the second wind turbine, and/or that that the first wind turbine be installed on different terrain from the second wind turbine, and/or that the second wind turbine be installed on flat terrain and the first wind turbine not be installed on flat terrain.

In other words, the two wind turbines do not stand next to each other. More particularly, the two wind turbines can be installed far away from each other. Their installation sites are preferably 50 km or more apart, and the two wind turbines may also be installed on different wind farms. It has been found that these installation sites may differ and that the measurement correlation can nevertheless be recorded at different installation sites and that the measurement correlation is nevertheless well suited for use in the first wind turbine.

In particular, the first wind turbine and the second wind turbine can also be installed on different terrains, for example on hilly terrain and on terrain that is wooded as well, or instead. Here, too, it has been found that a good measurement correlation can nevertheless be trained on the one terrain, while also being usable on a different terrain.

The second wind turbine is installed on flat terrain, in particular, and the first wind turbine is not installed on flat terrain. A flat terrain is a technical term used in the international standard (see IEC 61400-12-1 above). It refers to a location that differs only minimally from a plain and has no steep inclines.

It has been found that, on flat terrain, particularly good conditions prevail for training the measurement correlation. Especially when the first wind turbine is not installed on flat terrain, the measurement correlation can only be trained poorly or not at all. It is therefore proposed that the measurement correlation be taught on the flat terrain, i.e., that the second wind turbine, with which the correlation is trained, be installed on the flat terrain.

According to one embodiment, it is proposed that, in order to produce the power curve, measurement of the wind speed on the basis of the measurement correlation derived from the behavior of the rotor is carried out over a first measurement period in each case and that, in order to train the measurement correlation, the wind speed is recorded over a second measurement period, wherein the first measurement period is shorter than the second measurement period.

The wind speed is averaged or filtered in some other manner within the respective measurement period, i.e., within the first and also the second measurement period. It has therefore been found, in particular, that averaging over a long period reduces the fluctuation range of the wind speed, but that the power curve loses sharpness as a result. Especially when transitioning from partial-load operation to full-load operation, a power curve has a sharp transition which can also be described graphically as a kink. Small changes in wind speed there lead to significant changes in power output, thus resulting in this sharp transition in the power curve. This sharp transition is rounded by strong averaging and differs to that extent from the actual, ideally measured power curve.

It has now been realized, therefore, that the problem can be solved by using long measurement periods for training, i.e., that the second measurement period is long, but that very small measurement periods are expedient when applying the training, i.e., when producing the power curve, i.e., that the second measurement period is short. It has been found, in particular, that the selected measurement time, i.e., the first measurement period, can actually be very short when deriving the wind speed from the behavior of the rotor. When the wind speed is determined in this way, there is relatively little noise, so these short measurement times can be used. This means that the power curve can then be determined or measured very precisely and with a very sharp kink, especially at the transition from partial-load operation to full-load operation.

The second measurement period is at least twice as long as the first, in particular at least ten times as long as the first. The second measurement period is thus significantly longer, or even by a power of ten longer than the first.

More particularly, the first measurement period is less than 15 seconds, in particular less than ten seconds, and particularly preferably less than five seconds. This means that, even with a measurement period of five seconds or even less, in particular four seconds, it is still possible to determine the wind speed well on the basis of the rotor behavior.

The second measurement period is preferably at least 2 minutes long, in particular at least eight minutes long and, according to a preferred variant, it is ten minutes long. The comparison of the first and second measurement periods in respect of the aforementioned values shows that, given that the first measurement period is less than five seconds and the second measurement period is longer than eight minutes, the second measurement period is at least 96 times as long in this case as the first measurement period, i.e., it can be 100 times as long, or even longer.

It has been found, in particular, that significantly different measurement periods must be selected in order to produce the power curve, on the one hand, and to train the measurement correlation, on the other hand.

According to one embodiment, it is proposed that the reference wind sensor is arranged as at least one measuring sensor on a nacelle of the second wind turbine. It has been found here, in particular, that it may not be necessary to use a measurement mast. More particularly, a suitably accurate sensor can be installed on or in the second wind turbine, and such costs are incurred only once, because the values obtained, namely the derived measurement correlation, can be adopted in any case for all other wind turbines of identical construction. The solution of installing the reference wind sensor on the nacelle of the wind turbine has the advantage that the wind speed can also be measured accurately where it acts on the wind turbine, namely in the region of the rotor.

According to another variant, it is proposed that the reference wind sensor is provided in the form of a lidar sensor. This lidar sensor can be the proposed measuring sensor arranged on the nacelle. Another option is that the measuring sensors, be it the lidar sensor or other measuring sensors, are arranged at a plurality of positions, i.e., that a plurality of individual sensors are also used. This plurality of positions can preferably be on one blade each, so that in a wind turbine with three rotor blades, three such individual sensors are then used. It is possible as a result to record wind speed values at different positions in the wind field in front of the rotor, in order to derive the wind speed as a total wind speed.

The lidar sensor is preferably arranged on the nacelle, which also includes it being arranged on the spinner, the rotating part of the nacelle, and it measures wind speed values at a plurality of distances in front of the rotor, e.g., at distances of 30, 60 and 90 meters in front of the rotor. The expression "in front of the rotor" refers to the wind direction, so the area in front of the rotor is therefore the windward area of the rotor.

In addition or alternatively, the lidar sensor measures wind speed values at a plurality of distances from a rotor axis. In this way, it is also possible to take into account that the wind in the entire area in front of the rotor is not homogeneous and that differences depending on position may arise in this area in front of the rotor, namely the rotor surface. This aspect can be taken into account with these different distances.

In addition or alternatively, it is proposed that the lidar sensor measures wind speed values in a measurement cone directed at the wind in front of the rotor. This also allows a larger area to be scanned. The measurement cone can be formed by the lidar sensor having a beam direction and by this beam direction being tilted about a rotational axis of the lidar sensor, for example by a range of 10°-20°, in particular by 15°. As a result of this rotation, the beam direction then describes a cone-shaped envelope around the rotational axis as the center axis of the cone.

A wind speed can then be calculated from the measured wind speed values. This can be done in such a way that an average value is formed from all the measured wind speed values. However, these wind speed values can also be combined in some other way to form a wind speed, for example by forming a weighted average or by filtering these values when they are entered successively into such a filter, for example.

A wind speed is thus calculated in each case from many wind speed values. Such a wind speed is recorded over the second measurement period, in particular. To record another wind speed, particularly when the wind speed has changed, several wind speed values can then be recorded again during the second measurement period. One particular option here is that several wind speed values are recorded not only in the second measurement period, but that several values are also recorded on the basis of spatial variation.

According to one embodiment, it is proposed that a behavior of at least one rotor blade is recorded as the behavior of the rotor. In other words, the behavior of the rotor blade is recorded, and on that basis the wind speed is then calculated using the measurement correlation trained by means of the second wind turbine.

It is particularly preferred that a bending of the rotor blade is recorded as a behavior of the rotor. It has been found in this regard that the rotor blade bending depends on the wind speed and thus that such bending allows conclusions to be drawn about the wind speed. The measurement correlation specifies from which bending which wind speed can be derived. The measurement correlation has thus been trained in the manner described.

Training is thus carried out in such a way that, during operation of the second wind turbine, the wind causes the at least one rotor blade of the second wind turbine to bend. This bending depends on the wind speed, and this wind speed is simultaneously recorded by means of the reference wind sensor. This wind speed recorded by means of the reference wind sensor can then be assigned to the simultaneously recorded bending of the rotor blade. This results in such an assignment pair. This is repeated for many different wind speeds, so that as many assignment pairs as possible can be created. From the many assignment pairs, an overall picture is then obtained about the relationship between rotor blade bending and wind speed.

Unrecorded wind speeds, in other words wind speeds that occur between two recorded wind speeds, or indeed that are outside the recorded range, can be interpolated or extrapolated. Another option is that a functional correlation is derived from the many assignment pairs, e.g., by polynomial parameterization using a Gaussian method, for example. This can also be done in sections, for example if it is not practical to specify a suitable polynomial function for the entire range. A measurement correlation is thus determined in any case, and the parameterized polynomial function mentioned by way of example could also form such a measurement correlation or a part of it.

In the simplest case, when considering the bend of the blade, a bend at a single point is considered, namely static bending. However, it is also possible to measure the bending at a plurality of points in the same rotor blade and/or in a plurality of rotor blades, in particular in all rotor blades, and to calculate the wind speed on that basis. Accordingly, it is possible to produce a more complex measurement correlation that takes several bendings into account. Dynamic bending values may also be considered, if necessary. In addition or alternatively, the bends respectively recorded at given wind speeds can otherwise be combined to form a common value by forming an average.

A wind turbine for determining a power curve is also proposed, wherein
  the wind turbine has a rotor, and
  the power curve specifies a correlation between the wind speed and the power output that can be generated by the first wind turbine, and said wind turbine includes:
    a wind measurement unit for measuring the wind speed on the basis of a measurement correlation derived from a behavior of the rotor, wherein
    the measurement correlation specifies a correlation between the rotor behavior and the wind speed,
    an input interface for inputting the measurement correlation that was trained and produced by means of a second wind turbine of identical construction,
    a controller configured so that the power curve of the first wind turbine is produced by repeatedly and simultaneously recording a power output generated by the wind turbine and an associated wind speed while operating the wind turbine at varying wind speeds, and
    the wind speed being calculated from a behavior of the rotor of the first wind turbine on the basis of the measurement correlation trained by means of the second wind turbine.

The wind turbine thus has a wind measurement unit for measuring the wind speed on the basis of a measurement correlation derived from a behavior of the rotor. The measurement unit is configured, in particular, to measure a bend of a rotor blade and to determine the wind speed on the basis of the measurement correlation.

Via an input interface of the wind turbine, the wind turbine can obtain the measurement correlation that was trained and produced by means of a second wind turbine of identical construction. The input interface may be or include a wired or a wireless communication device, in particular a receiver, or it may be a device for receiving a data storage medium, to give another example.

The power curve can then be recorded using the controller. The controller is accordingly connected to the input interface and the wind measurement unit. A memory device, in particular a data storage device in which the measurement correlation can be stored and/or in which the recorded power curve can be stored, may also be provided. This data storage device is preferably part of the controller.

The wind turbine, in particular the controller, is configured to perform a method of determining a power curve in accordance with at least one of the embodiments described in the foregoing. The method of determining the power curve can be implemented in the controller. The measurement correlation is trained by another wind turbine and is entered via the input interface. The power curve is calculated on that basis.

A wind turbine arrangement is also proposed that comprises at least one first and one second wind turbine, this wind turbine arrangement being used to measure a power curve of the first wind turbine, wherein
  the first and the second wind turbine are identical in construction and each have a rotor having at least one rotor blade, wherein
  the power curve specifies a correlation between the wind speed and the power output that can be generated by the first wind turbine,
  the first wind turbine has a first wind measurement unit for measuring the wind speed on the basis of the measurement correlation derived from a behavior of the rotor, wherein
  the measurement correlation specifies a correlation between the rotor behavior and the wind speed, and
  the measurement correlation is trained by means of a second wind turbine of identical construction, wherein
  the second wind turbine has a reference wind sensor for training purposes, and
  the second wind turbine has a self-training controller which is configured so that, while the second wind turbine is being operated at varying wind speeds, the reference wind sensor repeatedly records a wind speed and assigns it to a behavior of the rotor of the second wind turbine simultaneously recorded by means of a second wind measurement unit of the second wind turbine, in order to produce the measurement correlation, wherein
  the first wind turbine has an input interface for inputting the measurement correlation that was trained and produced by means of the second wind turbine of identical construction, and
  the first wind turbine has a controller configured so that the power curve of the first wind turbine is produced by repeatedly and simultaneously recording a power output generated by the first wind turbine and an associated wind speed while operating the first wind turbine at varying wind speeds, and
  the wind speed being calculated from a behavior of the rotor of the first wind turbine on the basis of the measurement correlation trained by means of the second wind turbine.

Both the first wind turbine and the second wind turbine have a wind measurement unit, namely a first and second wind measurement unit, but these are identical in construction, or at least record the same rotor behavior or the same bending behavior of at least one respective rotor blade. The first wind turbine also has a controller that controls the wind turbine and that ultimately produces the power curve. The controller interacts with the wind measurement unit, and an input interface for the first wind turbine is also provided, via which the controller can receive the measurement correlation that was trained by means of the second wind turbine.

To that end, the second wind turbine has a self-training controller that controls the wind turbine accordingly and which also performs the assignment between the wind speed recorded by the reference sensor, which is part of the second wind turbine, and the rotor behavior that was recorded by the second wind measurement unit. In other words, the second wind turbine produces the measurement correlation and this can be inputted into the first wind turbine via the input interface.

The wind turbine arrangement is preferably configured to perform a method according to one of the embodiments described in the foregoing. In particular, this method can be implemented in the controller and the self-training controller, in which the respective parts are implemented.

BRIEF DESCRIPTION OF THE SEVERAL VIEWS OF THE DRAWINGS

The invention shall now be described in greater detail with reference to embodiments and to the accompanying drawings, in which.

DETAILED DESCRIPTION

Figure 1:
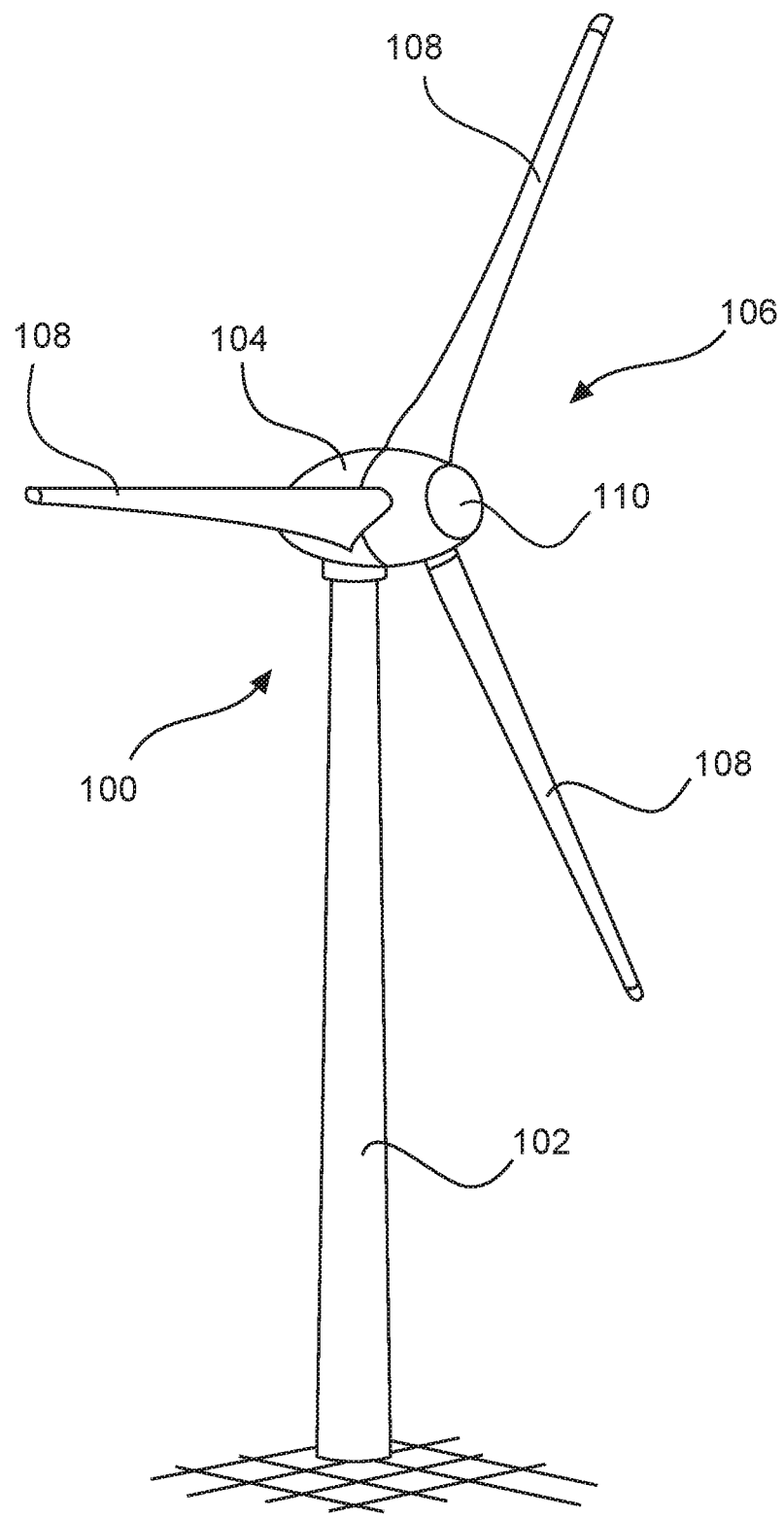
FIG. 1 shows a perspective view of a wind turbine.

FIG. 1 shows a wind turbine 100 comprising a tower 102 and a nacelle 104. A rotor 106 having three rotor blades 108 and a spinner 110 is arranged on nacelle 104. Rotor 106 is made to rotate by the wind and drives a generator in nacelle 104 as a result.

Figure 2:
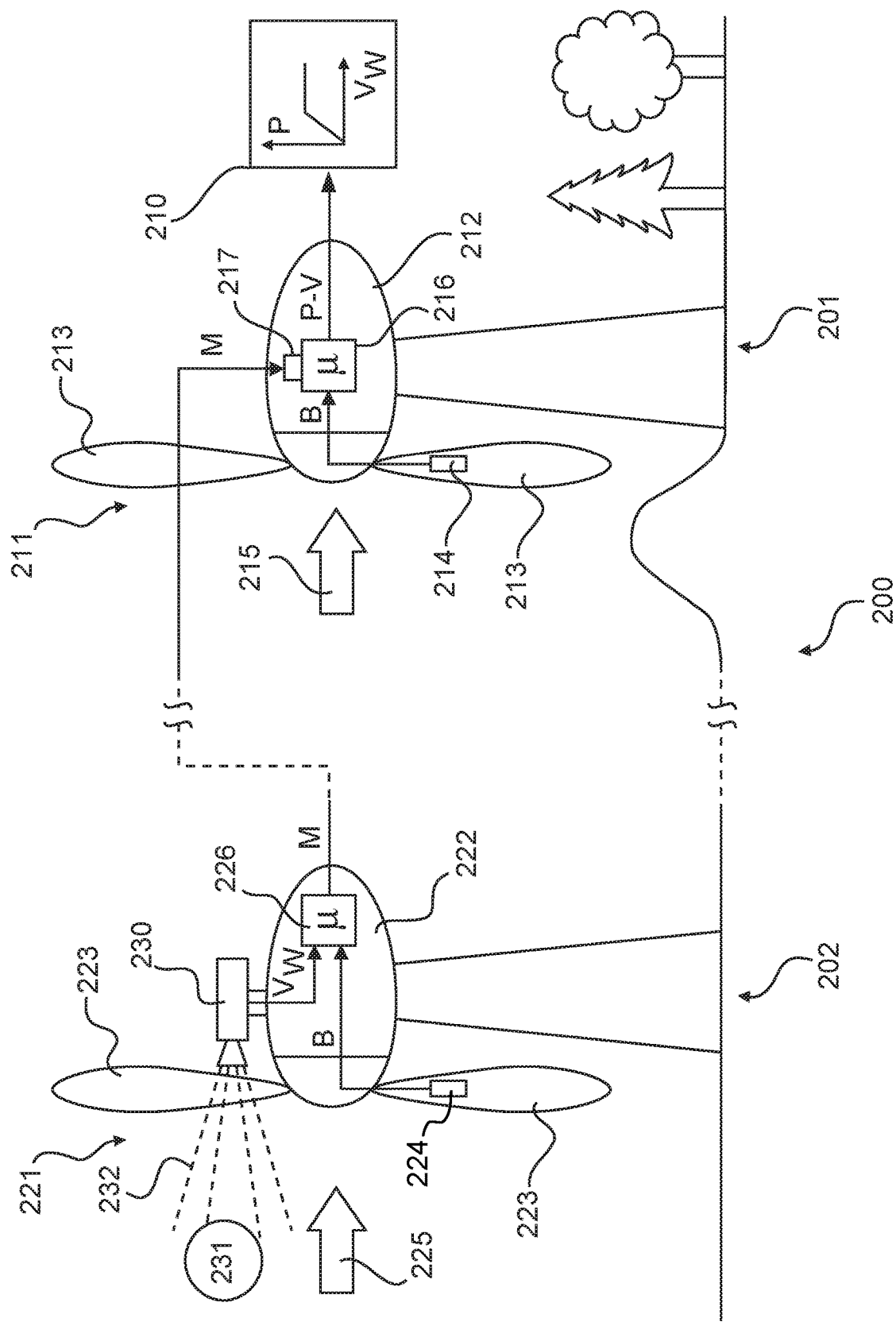
FIG. 2 shows a schematic view of a wind turbine arrangement.

FIG. 2 shows a wind turbine arrangement 200 comprising a first wind turbine 201 and a second wind turbine 202. Both wind turbines have a rotor 211, 221 and a nacelle 212, 222. Both rotors 211, 221 have a plurality of rotor blades 213, 223, of which only two are shown in the schematic view shown in FIG. 2.

Wind turbine arrangement 200 in FIG. 2 shall also be used to describe the method of determining a power curve. Such a power curve shows a relationship between the power output P that can be generated and a wind speed VW that is the cause of that power. Such a power curve 210 is shown purely schematically.

The schematic power curve 210 belongs to the first wind turbine 201. The first wind turbine 201 is installed on rather complicated terrain, not on flat terrain. This is suggested by the hill and by the trees.

The second wind turbine 202 is installed on flat terrain and this is illustrated by this second wind turbine 202 being installed on a substantially level substrate.

In order to produce power curve 210, a wind speed of the first wind 215 is determined by means of a first wind measurement unit 214 from a behavior of rotor 211, in particular from bending of at least one of rotor blades 213. Such elastic bending can be multidimensional, i.e., it can occur in several directions, and can be referred to as elastic deformation. The first wind turbine 201 is operated, and this can be controlled via controller 216. In operation, a bending B of rotor blade 213 is recorded and is inputted into controller 216 for further processing. In order to convert bending B into a wind speed VW, controller 216 needs a measurement correlation M. This measurement correlation M is inputted via an input interface 217 into controller 216 and thus into the first wind turbine. The first wind measurement unit 214 may be a strain gauge, gyroscope or accelerometer, among others.

Controller 216 can then calculate a wind speed from the recorded bending B and on the basis of measurement correlation M. At the same time, controller 216 can record a power output P that is generated at that moment. This can be used to produce a pair of values, namely an assignment pair P-V, which basically forms a point on power curve 210.

As the wind speed changes, this measurement is repeated several times to obtain such an assignment pair P-V each time and to use the latter to plot a power curve, namely power curve 210.

In order to obtain measurement correlation M, the latter is determined, namely trained, by means of the second wind turbine 202.

The second wind turbine 202 in FIG. 2 is installed not only on different terrain, but also far away from the first wind turbine 201. These two wind turbines 201 and 202 are shown next to each other in one figure purely for graphic illustration purposes. However, they may in fact be far away from each other, for example 50 km or 100 km, or even 500 km.

One condition for deriving measurement correlation M is that the first and second wind turbines 201 and 202 are identical in construction. Of course, this does not preclude the existence of minimal differences. However, the wind turbines are identical in construction to the extent that they exhibit substantially the same behavior. They are not identical in at least one point, in that a reference wind sensor 230, which may be an anemometer, is provided for the second wind turbine 202. This reference sensor 230 may be embodied as a lidar sensor and is arranged on nacelle 222. The size of reference sensor 230 is not shown to the same scale as nacelle 222. There are many other elements that are not shown to scale, but the reference sensor is drawn particularly large.

In any case, reference sensor 230 measures a rotor area 231 in front of rotor 221. According to the drawing in FIG. 2, the second wind 225 also comes from the left, so this rotor area 231 is windward of the second wind turbine 202.

Some measurement beams 232 are used to indicate that reference wind sensor 230 measures in rotor area 230. Measurement beams 232 are shown in different directions and with different lengths. They can therefore take measurements at different distances from rotor 221 and can also scan their areas in the vertical direction. They can also so this in the horizontal direction, but this is not shown in the drawing. More particularly, measurement beams 232 can form a cone-shaped envelope.

A wind speed VW is thus measured by means of this reference wind sensor 230. A behavior of rotor 221, namely a bending B of the second rotor blade 223, is simultaneously determined by means of a second wind measurement unit 224. The measured wind speed VW and the measured bending B are inputted into a self-training controller 226. This self-training controller 226, or some other controller, can also control the second wind turbine 202, in particular on the basis of a power-speed curve. The second wind measurement unit 224 may be a strain gauge, gyroscope or accelerometer, among others.

Self-training controller 226 the associates the measured wind speed VW and the simultaneously measured bending B to form a single correlation pair. This is then repeated for different wind speeds, with a correlation pair being formed each time, which can finally be combined to form measurement correlation M. It is also possible that these collected correlation pair are not only collected, but are also translated, for example, into a correlation curve, for example by averaging or filtering, or by specifying a polynomial function to be parameterized.

The result, in any case, is measurement correlation M, and this is then outputted by the second wind turbine 202 and transferred to the first wind turbine 201, where it inputted via input interface 217 into the first wind turbine 201, and specifically into controller 216.

The measurement correlation M determined in this manner and then received by the first wind turbine then allows the wind speed to be calculated successively on the basis of the recorded bending B and to assign it to a simultaneously recorded power output in order to produce power curve 210.

The invention claimed is:

1. A method of determining a power curve indicating a relationship between wind speed and a power output that can be generated by a first wind turbine having a rotor, comprising:
    training a measurement correlation using a second wind turbine of substantially identical construction as the first wind turbine, the measurement correlation indicating a correlation between rotor behavior of the second wind turbine and wind speed measured at the second wind turbine, training the measurement correlation using the second wind turbine including:
        while the second wind turbine is being operated at varying wind speeds, repeatedly recording, by a reference wind sensor of the second wind turbine, the wind speed and assigning the recorded wind speed to a simultaneously recorded rotor behavior of the second wind turbine;
    sending the measurement correlation of the second wind turbine to the first wind turbine; and
    while operating the first wind turbine at varying wind speeds, generating the power curve of the first wind turbine by repeatedly and simultaneously recording the power output generated by the first wind turbine and an associated wind speed, wherein the associated wind speed at the first wind turbine is determined by at least:
        recording a rotor behavior of the first wind turbine; and
        determining, using the recorded rotor behavior of the first wind turbine, the associated wind speed at the first wind turbine from the measurement correlation of the second wind turbine such that the associated wind speed at the first wind turbine is determined depending on the rotor behavior of the first wind turbine, the rotor behavior of the second wind turbine and the repeatedly recorded wind speed by the reference wind sensor of the second wind turbine.

2. The method according to claim 1, wherein:
    the first wind turbine is installed on a different installation site than the second wind turbine,
    the first wind turbine is installed in different terrain than the second wind turbine, or
    the second wind turbine is installed on flat terrain and the first wind turbine is installed on non-flat terrain.

3. The method according to claim 2, wherein the different installation site is a different wind farm.

4. The method according to claim 1, wherein
    the power curve is generated during a first period, and
    the measurement correlation is trained during a second period different from the first period.

5. The method according to claim 4, wherein the first period is shorter than the second period.

6. The method according to claim 4, wherein the second period is at least twice as long as the first period.

7. The method according to claim 4, wherein the second period is at least ten times as long as the first period.

8. The method according to claim 4, wherein the first period is less than 15 seconds, less than ten seconds or less than five seconds and the second period is at least two minutes or at least eight minutes.

9. The method according to claim 1, wherein the reference wind sensor is arranged as at least one measuring sensor on a nacelle of the second wind turbine.

10. The method according to claim 1, wherein the reference wind sensor is a lidar sensor and
    measures wind speed values at a plurality of distances in front of the rotor,
    measures the wind speed values at a plurality of distances from a rotor axis, or
    measures the wind speed values in a measurement cone directed at wind in front of the rotor.

11. The method according to claim 10, wherein the lidar sensor is arranged on a nacelle.

12. The method according to claim 10, wherein the reference wind sensor calculates the wind speed from the measured wind speed values.

13. The method according to claim 12, wherein the reference wind sensor averages the measured wind speed values.

14. The method according to claim 1, comprising:
    recording a behavior of at least one rotor blade as the rotor behavior of the rotor.

15. The method according to claim 14, comprising:
    recording at least one bending or elastic deformation of the at least one rotor blade as the rotor behavior.

16. A first wind turbine for determining a power curve, comprising:
    a rotor, wherein the power curve indicates a correlation between wind speed and a power output that can be generated by the first wind turbine;
    an input interface configured to receive a measurement correlation that was trained and generated by a second wind turbine of substantially identical construction as the first wind turbine, wherein the measurement correlation indicates a correlation between a rotor behavior of the second wind turbine and the wind speed; and
    a controller configured to determine an associated wind speed based on the measurement correlation, and generate the power curve of the first wind turbine by repeatedly and simultaneously recording the power output generated by the first wind turbine and the associated wind speed while operating the first wind turbine at varying wind speeds, wherein the associated wind speed at the first wind turbine is determined by at least:
        recording a rotor behavior of the first wind turbine; and
        determining, using the recorded rotor behavior of the first wind turbine, the associated wind speed at the first wind turbine from the measurement correlation of the second wind turbine such that the associated wind speed at the first wind turbine is determined depending on the rotor behavior of the first wind turbine, the rotor behavior of the second wind turbine and a repeatedly recorded wind speed by a reference wind sensor of the second wind turbine.

17. A wind turbine arrangement, comprising:
    first and second wind turbines for measuring a power curve of the first wind turbine, wherein the first and the second wind turbines are substantially identically constructed and each has a rotor having at least one rotor blade, wherein the power curve indicates a correlation between wind speed and power output that can be generated by the first wind turbine,
    wherein the first wind turbine includes:
        a first wind measurement device configured to measure an associated wind speed based on a measurement correlation derived from a rotor behavior of the second wind turbine, wherein the measurement correlation indicates a correlation between the rotor behavior of the second wind turbine and wind speed measured at the second wind turbine, and
    wherein the second wind turbine includes:

a reference wind sensor for training the measurement correlation;

a second wind measurement device configured to measure the wind speed at the second wind turbine; and a self-training controller configured such that, while the second wind turbine is being operated at varying wind speeds, the reference wind sensor repeatedly records the wind speed at the second wind turbine and assigns the wind speed at the second wind turbine to the rotor behavior of the second wind turbine to produce the measurement correlation, and wherein the first wind turbine includes:

an input interface configured to receive the measurement correlation; and a controller configured so that the power curve of the first wind turbine is generated by repeatedly and simultaneously recording the power output generated by the first wind turbine and the associated wind speed while operating the first wind turbine at varying wind speeds, and the associated wind speed at the first wind turbine being determined by at least:

recording a rotor behavior of the first wind turbine; and determining, using the recorded rotor behavior of the first wind turbine, the associated wind speed at the first wind turbine from the measurement correlation of the second wind turbine such that the associated wind speed at the first wind turbine is determined depending on the rotor behavior of the first wind turbine, the rotor behavior of the second wind turbine and the repeatedly recorded wind speed by the reference wind sensor of the second wind turbine.

\* \* \* \* \*